United States Patent
Ouchi (10) Patent No.: US 8,724,185 B2
(45) Date of Patent: May 13, 2014

(54) LIGHT GUIDE MEMBER, ILLUMINATING DEVICE, AND IMAGE READING APPARATUS AND IMAGE FORMING APPARATUS USING SAME

(71) Applicant: KYOCERA Document Solutions Inc., Osaka (JP)

(72) Inventor: Kei Ouchi, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/752,731

(22) Filed: Jan. 29, 2013

(65) Prior Publication Data
US 2013/0194641 A1    Aug. 1, 2013

(30) Foreign Application Priority Data
Jan. 31, 2012  (JP) ................................. 2012-017726

(51) Int. Cl.
*H04N 1/04* (2006.01)
(52) U.S. Cl.
USPC ............ 358/474; 358/475; 358/498; 358/497
(58) Field of Classification Search
USPC ..................... 358/474, 475, 498, 497, 496
See application file for complete search history.

(56) References Cited

U.S. PATENT DOCUMENTS

| | | | | |
|---|---|---|---|---|
| 5,969,343 | A | * | 10/1999 | Nakamura et al. ........ 250/227.31 |
| 6,160,948 | A | * | 12/2000 | McGaffigan .................. 385/146 |
| 6,375,335 | B1 | | 4/2002 | Tabata et al. |
| 2005/0265684 | A1 | | 12/2005 | Nemoto et al. |
| 2006/0165370 | A1 | | 7/2006 | Nemoto et al. |
| 2009/0201675 | A1 | * | 8/2009 | Onishi et al. .................. 362/223 |
| 2011/0157913 | A1 | | 6/2011 | Kim et al. |
| 2011/0164412 | A1 | | 7/2011 | Kamei et al. |
| 2012/0014136 | A1 | | 1/2012 | Lee et al. |

FOREIGN PATENT DOCUMENTS

| | | |
|---|---|---|
| JP | 10-241432 | 9/1998 |
| JP | 2002-157911 | 5/2002 |

* cited by examiner

*Primary Examiner* — Houshang Safaipour
(74) *Attorney, Agent, or Firm* — Gerald E. Hespos; Michael J. Porco; Matthew T. Hespos (57) ABSTRACT

A light guide member includes a main body part, and an entrance surface, a strip-shaped exit surface and a strip-shaped reflecting surface that are formed on the main body part. The illumination light is output from the exit surface. The reflecting surface extends in the first direction on a face placed opposite to the exit surface of the main body part and reflects the illumination light. The reflecting surface includes, on a flat face, a reflection pattern surface provided with a plurality of minute reflective concave parts having a function of reflecting the illumination light toward the exit surface. The reflective concave parts each include a deflection surface which deflects the illumination light in a direction in which a reflection angle widens in a cross sectional view in a second direction that is orthogonal to the first direction in a horizontal direction, and then reflects the illumination light.

11 Claims, 11 Drawing Sheets

SUB SCANNING DIRECTION

LIGHT GUIDE MEMBER, ILLUMINATING DEVICE, AND IMAGE READING APPARATUS AND IMAGE FORMING APPARATUS USING SAME

This application relates to and claims priority from Japanese Patent Application No. 2012-17726, filed on Jan. 31, 2012, the entire disclosure of which is incorporated herein by reference.

BACKGROUND

The present disclosure relates to a light guide member for guiding an illumination light emitted from a light source, an illuminating device using the foregoing light guide member, and an image reading apparatus and an image forming apparatus using the same.

An image forming apparatus such as a scanner or a copy machine uses an illuminating device, which irradiates light on a document sheet, in order to optically read an image of the document sheet. In recent years, a white light emitting diode (LED) is being used as the light source of the illuminating device due to its advantage of having high luminous efficiency. With this type of illuminating device, it is necessary to linearly illuminate the document sheet. Therefore, a bar-shaped light guide member and the white LED are combined to generate a linear illumination light since an LED is a point light source. The light guide member includes an entrance surface which is disposed at one end of the light guide member and through which the illumination light emitted by the white LED enters, a strip-shaped exit surface which extends in the longitudinal direction of the light guide member and outputs the illumination light therefrom, and a strip-shaped reflecting surface which is formed on a face of the light guide member, the face being placed opposite to the exit surface and which reflects the illumination light.

The illumination light that entered the entrance surface propagates within the light guide member and is output to the outside from the exit surface. This outgoing light includes an illumination light (direct light) that heads directly from the white LED to the reflecting surface and then is reflected off the reflecting surface, and an illumination light (indirect light) which heads toward the reflecting surface after being totally reflected one or more times by a peripheral surface of the light guide member and that is reflected off the reflecting surface. The direct light is mainly output from a portion near the entrance surface. Here, since the direct light and the indirect light have different illumination intensity, there is a problem in that the uniformity of the illumination light cannot be obtained in the longitudinal direction of the light guide member. In order to resolve this problem, with a conventional illuminating device, the cross section shape of the light guide member is formed in a polygonal shape, and the shape of its main scanning direction is caused to be different so that the direct light is not output from the exit surface.

Nevertheless, in order to generate an indirect light, the illumination light emitted from the white LED needs to be totally reflected at least one by the peripheral surface of the light guide member. Consequently, with the light guide member of a conventional illuminating device, a certain length of distance needs to be provided between the near ends of the entrance surface and the exit surface. This leads to the entire length of the light guide member being extended, and inhibits the miniaturization of the illuminating device.

SUMMARY

The light guide member according to one aspect of the present disclosure is a light guide member which is used by being combined with a light source that emits an illumination light, and includes a main body part, and an entrance surface, a strip-shaped exit surface and a strip-shaped reflecting surface that are formed on the main body part. The main body part has a long rod shape in a first direction and guides the illumination light. The entrance surface is one end face of the main body part and the illumination light enters therein. The exit surface extends in the first direction on a surface of the main body part and the illumination light is output therefrom. The reflecting surface extends in the first direction on a face of the main body part, the face being placed opposite to the exit surface, and reflects the illumination light. The reflecting surface includes, on a flat face, a reflection pattern surface provided with a plurality of minute reflective concave parts having a function of reflecting the illumination light toward the exit surface. The reflective concave parts each include a deflection surface which deflects the illumination light in a direction in which a reflection angle widens in a cross sectional view in a second direction that is orthogonal to the first direction in a horizontal direction, and reflects the illumination light.

The illuminating device according to another aspect of the present disclosure includes a light source which emits an illumination light, and the foregoing light guide member which is used by being combined with the light source.

The image reading apparatus according to another aspect of the present disclosure includes the foregoing illuminating device which irradiates an illumination light on a document sheet, and a light-receiving device which receives a reflected light from the document sheet and converts the reflected light into an electrical signal, wherein the first direction is a main scanning direction, and the second direction is a sub scanning direction.

The imaging forming apparatus according to yet another aspect of the present disclosure includes the foregoing image reading apparatus, and an image carrier in which an electrostatic latent image is formed on a peripheral surface thereof based on image data output from the image reading apparatus.

DETAILED DESCRIPTION

Figure 1:
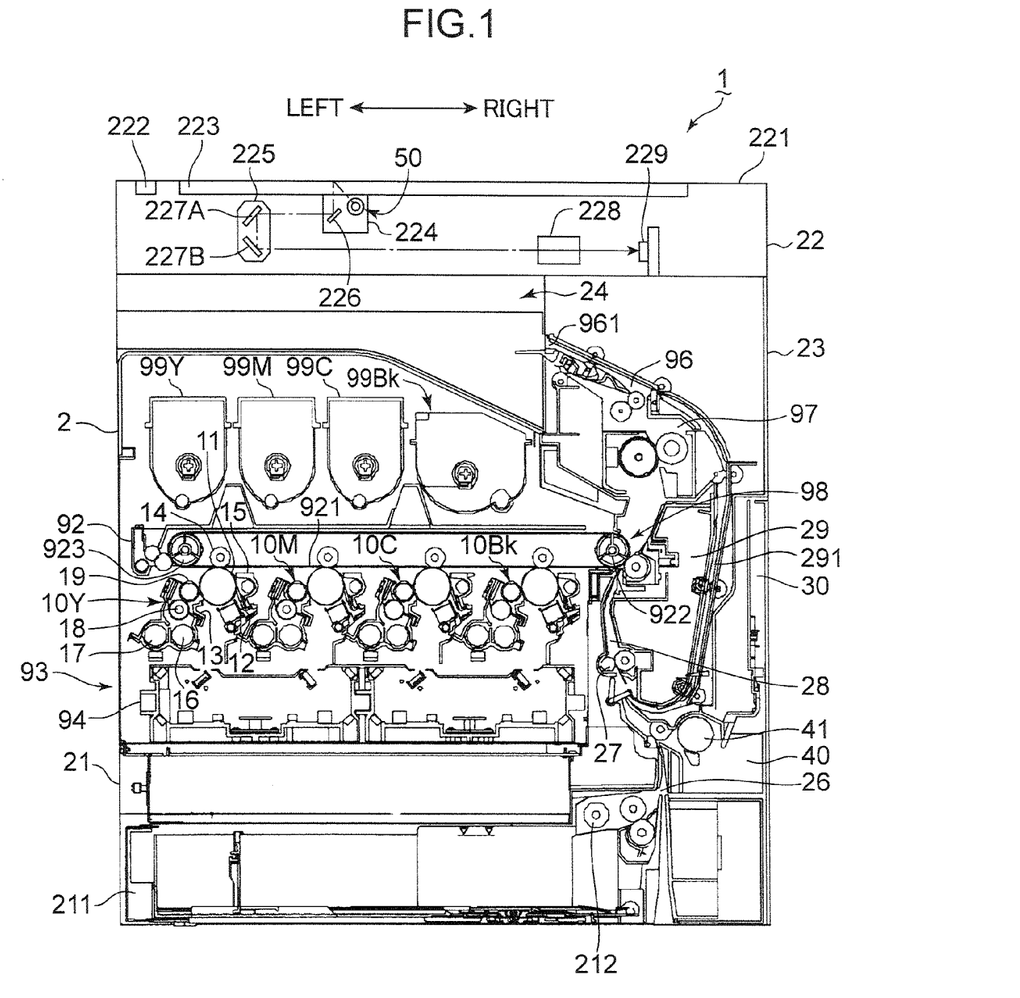
FIG. 1 is a cross sectional view showing a schematic configuration of the image reading apparatus and the image forming apparatus according to an embodiment of the present disclosure.

Embodiments of the present disclosure are now explained in detail with reference to the drawings. FIG. 1 is a cross sectional view showing the internal structure of the image forming apparatus 1 according to an embodiment of the present disclosure. Here, as the image forming apparatus 1, illustrated is a so-called internal discharge-type copy machine. Note that the apparatus to which the illuminating device according to the present disclosure can be applied is not limited to a copy machine, and the present disclosure can also be applied to, for example, a scanner device, a facsimile device, or a multifunction machine.

The image forming apparatus 1 includes a housing 2 having a case structure of a substantially rectangular shape and which includes an internal space (internal sheet discharge unit 24). The housing 2 includes a lower case (apparatus body 21) which houses various equipment for forming images, an upper case (image reading apparatus 22) disposed above the apparatus body 21, and a connecting case 23 which connects the apparatus body 21 and the image reading apparatus 22. The image reading apparatus 22 optically reads an image of a document sheet, and generates image data according to the document image. The apparatus body 21 performs processing of forming a toner image on a sheet based on the image data. An internal sheet discharge unit 24 for discharging the sheet after image is formed thereon is provided between the apparatus body 21 and the image reading apparatus 22. The connecting case 23 is disposed on the right-side face of the housing 2, and is provided with a discharge outlet 961 for discharging the sheet to the internal sheet discharge unit 24.

The apparatus body 21 internally houses, in order from the upper side, toner containers 99Y, 99M, 99C, 99Bk, an intermediate transfer unit 92, an image forming unit 93, an exposure unit 94, and a sheet feed cassette 211.

In order to form a full-color toner image, the image forming unit 93 includes four image forming units 10Y, 10M, 10C, 10Bk for forming the respective toner images of yellow (Y), magenta (M), cyan (C) and black (Bk). The respective image forming units 10Y, 10M, 10C, 10Bk include a photoconductive drum 11, and a charging unit 12, a developing device 13, a primary transfer roller 14 and a cleaning device 15 disposed around the photoconductive drum 11.

The photoconductive drum 11 rotates around its axis, and an electrostatic latent image and a toner image are formed on its peripheral surface. As the photoconductive drum 11, used may be a photoconductive drum configured from an amorphous silicon (a-Si)-based material. The charging unit 12 uniformly charges the surface of the photoconductive drum 11. The peripheral surface of the photoconductive drum 11 after the charging is exposed by the exposure unit 94, and an electrostatic latent image is formed thereon.

The developing device 13 provides a toner to the peripheral surface of the photoconductive drum 11 in order to develop the electrostatic latent image formed on the photoconductive drum 11. The developing device 13 is for use with a two-component developer, and includes agitation rollers 16, 17, a magnetic roller 18, and a development roller 19. The agitation rollers 16, 17 charge the toner by circulating and conveying the two-component developer, while agitating the toner. A two-component developer layer is formed on the peripheral surface of the magnetic roller 18, and a toner layer formed as a result of the toner being transferred between the magnetic roller 18 and the development roller 19, via potential difference, is formed on the peripheral surface of the development roller 19. The toner on the development roller 19 is supplied to the peripheral surface of the photoconductive drum 11, and the electrostatic latent image is developed thereby.

The primary transfer roller 14 forms a nip portion with the photoconductive drum 11 across an intermediate transfer belt 921 provided to the intermediate transfer unit 92, and transfers, as primary transfer, the toner on the photoconductive drum 11 onto the intermediate transfer belt 921. The cleaning device 15 cleans the peripheral surface of the photoconductive drum 11 after the toner image is transferred.

A yellow toner container 99Y, a magenta toner container 99M, a cyan toner container 99C, and a black toner container 99Bk respectively store toners of the respective colors, and supply the toners of the respective colors, through a supply channel not shown, to the developing device 13 of the image forming units 10Y, 10M, 10C, 10Bk corresponding to the respective colors of Y, M, C, Bk.

The exposure unit 94 includes various optical equipment such as a light source, a polygon mirror, a reflective mirror, and a deflection mirror, and forms an electrostatic latent image by irradiating light based on image data of the document image on the peripheral surface of the photoconductive drum 11 provided to the respective image forming units 10Y, 10M, 10C, 10Bk.

The intermediate transfer unit 92 includes an intermediate transfer belt 921, a drive roller 922 and a driven roller 923. The toner image on the photoconductive drum 11 of the respective colors is overlaid (primary transfer) on the intermediate transfer belt 921. The overlaid toner image is transferred, as secondary transfer, onto the sheet supplied from the sheet feed cassette 211 or the sheet feed tray 30 in the secondary transfer unit 98. The drive roller 922 and the driven roller 923 for rotatively driving the intermediate transfer belt 921 are rotatably supported by the apparatus body 21.

The sheet feed cassette 211 houses a sheet bundle in which a plurality of sheets are layered. A pickup roller 212 is disposed at the upper part on the right end side of the sheet feed cassette 211. Based on the drive of the pickup roller 212, the uppermost sheet of the sheet bundle in the sheet feed cassette 211 is fed one sheet at a time to the delivery path 26. Note that a sheet feed unit 40 including a sheet feed tray 30 for manually feeding sheet is provided to the right side face of the apparatus body 21. The sheet mounted on the sheet feed tray 30 is carried to the delivery path 26 by driving of the sheet feed roller 41 of the sheet feed unit 40.

Provided to the downstream side of the delivery path 26 is a sheet path 28 which extends to the discharge outlet 961 via the secondary transfer unit 98, and a fixing unit 97 and a sheet discharge unit 96 described later. The upstream part of the sheet path 28 is formed between an inner wall formed on the apparatus body 21 and an inner wall formed on the inner surface of the reverse transfer unit 29. Note that the outer face of the reverse transfer unit 29 configures one face of a reverse path 291 on which the sheet is reversed and transferred during double-side printing. A resist roller pair 27 is disposed on a side of the sheet path 28 that is more upstream than the secondary transfer unit 98. The sheet is once stopped at the resist roller pair 27 and, after being subject to skew correction, conveyed to the secondary transfer unit 98 at a predetermined timing for performing the image transfer.

A fixing unit 97 and a sheet discharge unit 96 are housed inside the connecting case 23. The fixing unit 97 includes a fixing roller and a pressure roller, and fixing processing is performed by heating and pressing the sheet, to which the toner image is secondarily transferred, in the secondary transfer unit 98. The sheet with the color image that is subject to the fixation processing is discharged from the discharge outlet 961 toward the internal sheet discharge unit 24 by the sheet discharge unit 96 disposed downstream of the fixation unit 97.

The image reading apparatus 22 includes a first contact glass 222 and a second contact glass 223 fitted into an upper face 221 of the upper case. The first contact glass 222 is provided for use in reading the document sheet automatically fed from an automatic document feeder (ADF; not shown) when an ADF is disposed on the image reading apparatus 22. The second contact glass 223 is provided for use in reading a hand-placed document sheet.

The image reading apparatus 22 includes a first moving carriage 224, a second moving carriage 225, a condenser lens unit 228 and an imaging device 229 (light-receiving device) housed in the upper case. Mounted on the first moving carriage 224 are the illuminating device 50 according to an embodiment of the present disclosure, and a first reflective mirror 226. Mounted on the second moving carriage 225 are a second reflective mirror 227A and a third reflective mirror 227B for reversing the light path.

The first moving carriage 224 moves reciprocally in the left-right direction along the lower surface of the first contact glass 222 and the second contact glass 223. The second moving carriage 225 reciprocally moves in the left-right direction at ½ the travel distance of the first moving carriage 224. During the automatic feed mode where the document sheet is automatically fed from an automatic document feeder not shown, the first moving carriage 224 moves to a position immediately below the first contact glass 222, and becomes stationary. In this stationary condition, light is emitted from the illuminating device 50 toward the document sheet. Meanwhile, during the hand-placement mode where the document sheet is manually placed on the second contact glass 223, the first moving carriage 224 moves from a position immediately below the left end of the second contact glass 223 toward the right in accordance with the size of the document sheet. During this movement, light is emitted from the illuminating device 50 toward the document sheet. The second moving carriage 225 moves rightward following the first moving carriage 224 at ½ the travel distance of the first moving carriage 224.

The illuminating device 50 irradiates a linear illumination light, which extends in the main scanning direction, on the document sheet. Specifically, the illuminating device 50 emits an illumination light for optically reading the document sheet image toward the automatically fed document sheet that passes on the first contact glass 222 or toward the manually placed document sheet mounted on the second contact glass 223. The first reflective mirror 226 reflects, toward the second reflective mirror 227A of the second moving carriage 225, the reflected light of the illumination light that is emitted by the illuminating device 50 toward the document sheet.

The second reflective mirror 227A reflects, toward the third reflective mirror 227B, the reflected light that is reflected by the first reflective mirror 226. The third reflective mirror 227B reflects the reflected light toward the condenser lens unit 228. The condenser lens unit 228 images the optical image of the reflected light, which is reflected by the third reflective mirror 227B, on the imaging surface of the imaging device 229. The imaging device 229 is configured from a charge coupled device (CCD) or the like, and photoelectrically converts the reflected light into an analog electrical signal. This analog electrical signal is converted into a digital electrical signal via an A/D conversion circuit (not shown), and thereafter input as image data into the foregoing exposure unit 94.

A white reference plate (not shown) for deciding the white reference of the reading concentration is disposed on the left end side of the second contact glass 223. An illumination light is irradiated on the white reference plate before the image reading operation, the reflected light thereof is received by the imaging device 229, and a correction value for outputting the image data at such time uniformly in the main scanning direction is acquired in advance (shading correction).

Figure 2:
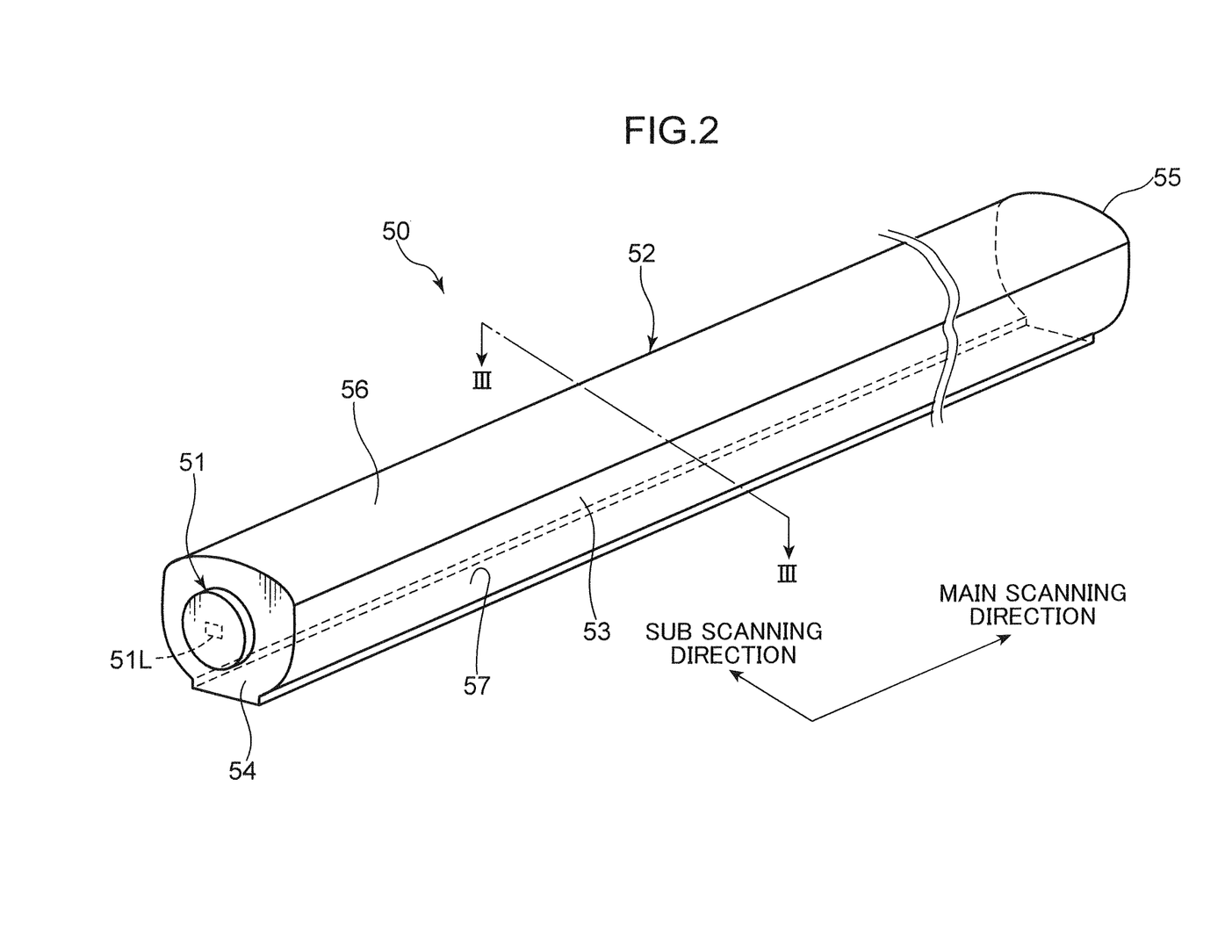
FIG. 2 is a perspective view showing the illuminating device according to an embodiment of the present disclosure.
Figure 3:
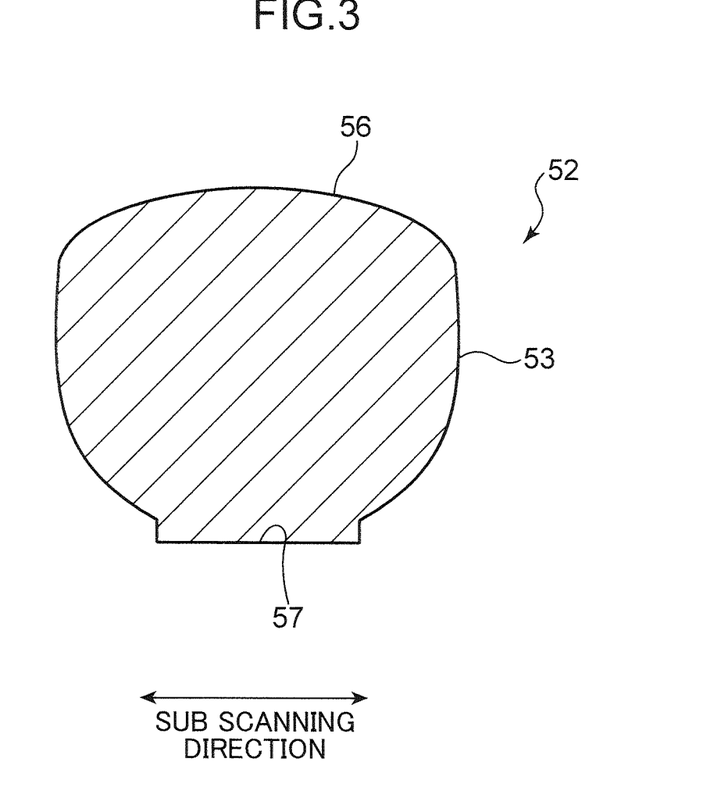
FIG. 3 is a cross sectional view of line III-III of FIG. 2.

The illuminating device 50 is now explained in detail. FIG. 2 is a perspective view of the illuminating device 50, and FIG. 3 is a cross sectional view of line III-III of FIG. 2. The illuminating device 50 includes a light source 51 for emitting an illumination light, and a light guide member 52 which propagates the illumination light emitted from the light source 51 and which converts the illumination light into a linear illumination light and outputs the linear illumination light.

Figure 7:
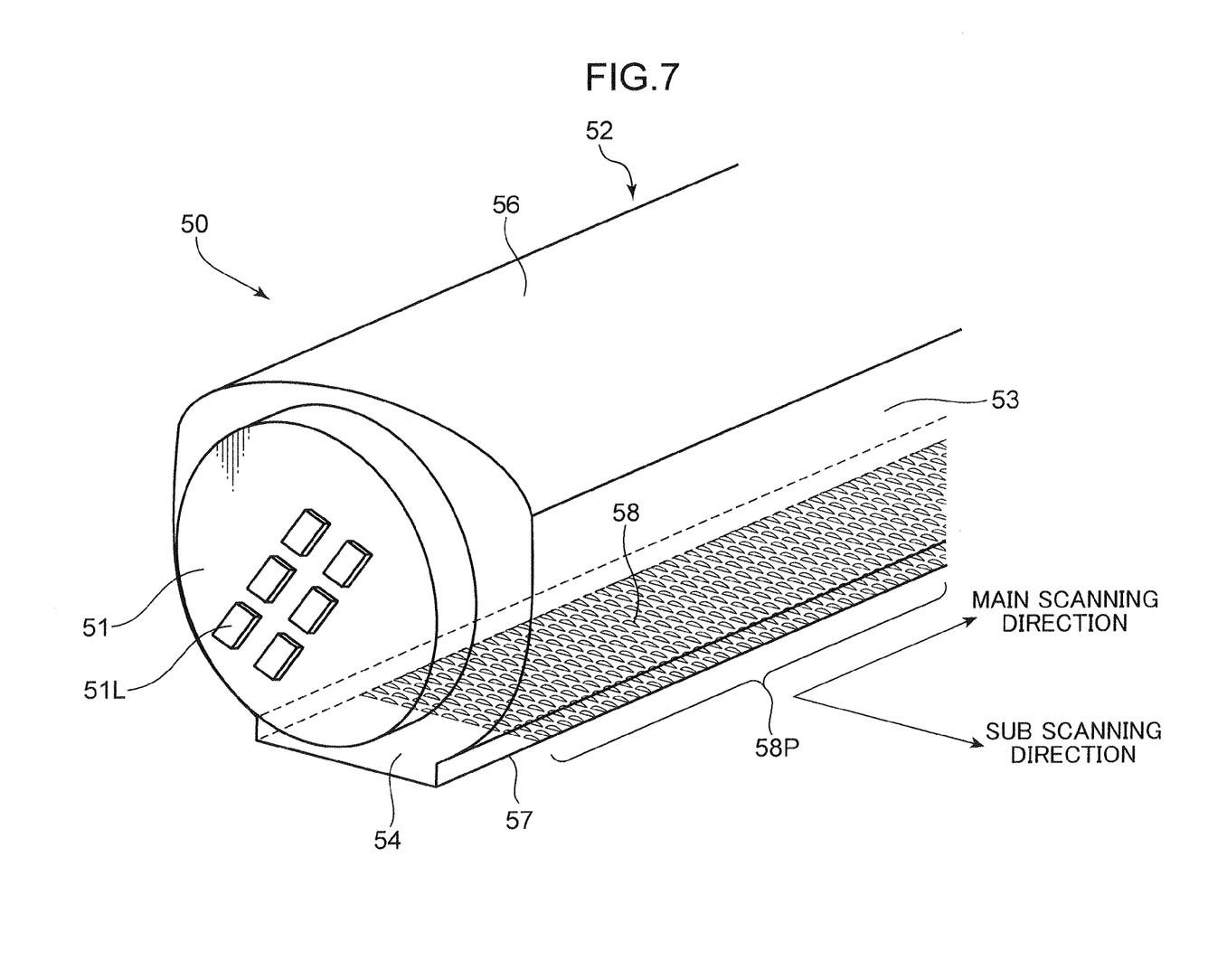
FIG. 7 is a perspective view showing the vicinity of the entrance surface of the light guide member.

The light source 51 has a thin discoid shape, and includes a white light emitting diode (LED) 51L which emits a white light. As the white LED 51L, used may be, for example, an LED package configured by sealing a GaN-based or an InGaN-based semiconductor light-emitting device which emits a blue light or a ultraviolet light into a phosphor-containing transparent resin. Note that, while one white LED 51L is shown in FIG. 2, in reality a plurality of moduled white LEDs 51L are provided to the light source 51 as shown in FIG. 7.

The light guide member 52 is molded from a translucent resin material, has a long rod shape in the main scanning direction (first direction), and includes a main body part 53 which guides the illumination light emitted from the light source 51, an entrance surface 54 which is one end face of the main body part 53 and through which the illumination light enters, and a far end face 55 which is an end face on a side placed opposite to the entrance surface 54. A light-emitting face of the foregoing light source 51 is in contact with the entrance surface 54. The far end face 55 is provided with an antireflective coating layer for preventing the illumination light from leaking from the far end face 55.

The light guide member 52 additionally includes an exit surface 56 disposed on the upper face side of the main body part 53 (side that faces the first, second contact glasses 222, 223), and a reflecting surface 57 disposed on the lower face side of the main body part 53 in a manner of facing the exit surface 56. The exit surface 56 is a strip-shaped face extending in the main scanning direction, and is a face that outputs the illumination light toward the first, second contact glasses 222, 223 (document sheet). The reflecting surface 57 is similarly a strip-shaped face extending in the main scanning direction, and reflects, toward the exit surface 56, the illumination light that is propagating in the main body part 53. The exit surface 56 has a relatively moderate convex curved surface in the sub scanning direction. Meanwhile, the reflecting surface 57 is a flat face. As described in detail later, the reflecting surface 57 includes a reflection pattern surface 58P (refer to FIG. 7) provided with a plurality of minute reflective concave parts (oval concave parts 58).

Figure 4:
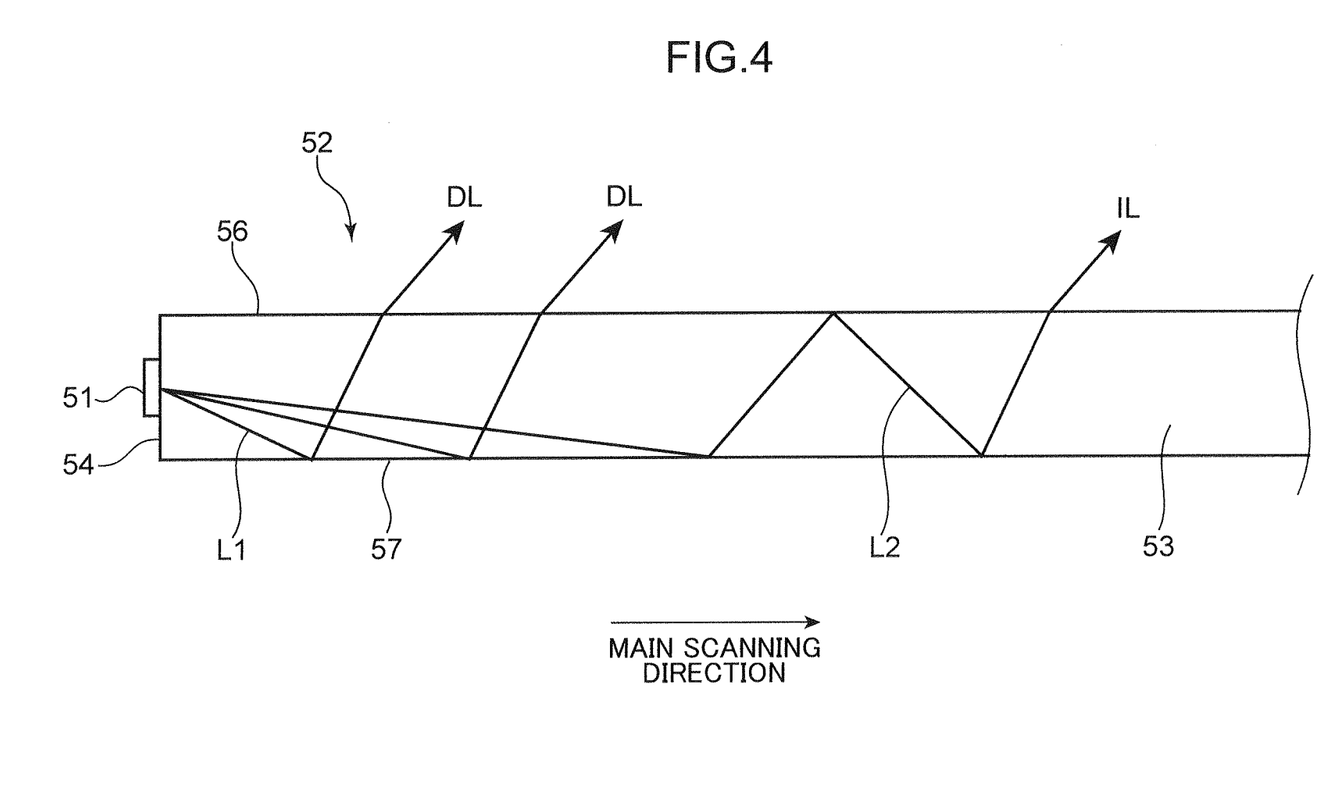
FIG. 4 is a schematic diagram showing the reflection state of the illumination light in the light guide member.

FIG. 4 is a diagram schematically showing the propagation state of the illumination light in the light guide member 52. The illumination light enters the main body part 53 through the entrance surface 54 from the light source 51. Since the light source 51 is a point light source, the illumination light has the characteristics of diffused light. The entered illumination light basically advances in the direction of the far end face 55 while repeating total reflection on the peripheral surface of the main body part 53 based on the refractive index difference between the constituent material of the light guide member 52 and air. Nevertheless, as a result of the reflecting surface 57 including the reflection pattern surface 58P described later being provided facing the exit surface 56, the illumination light is output from the exit surface 56. Since the main body part 53 has a long bar shape in the main scanning direction, the illumination light emitted from the light guide member 52 becomes a linear illumination light extending in the main scanning direction.

As described above, the illumination light output from the light guide member 52 contains a direct light DL and an indirect light IL. The direct light DL is an illumination light L1 which directly heads toward the reflecting surface 57 from the light source 51, and is the light that is output from the exit surface 56 as a result of the illumination light L1 being reflected off the reflecting surface 57 (reflection pattern surface 58P). Meanwhile, the indirect light IL is an illumination light L2 which heads toward the reflecting surface 57 after being totally reflected one or more times by the peripheral surface of the main body part 53, and is the light that is output from the exit surface 56 as a result of the illumination light L2 being reflected off the reflecting surface 57. The direct light DL is mainly output from the portion near the entrance surface 54 on the exit surface 56.

Conventionally, generally used as the reflection pattern surface formed on the reflecting surface 57 was a V-shaped concave groove extending in the sub scanning direction, which is a minute concave grove that functions similarly to a prism. A reflection pattern in which a plurality of such V-shaped prisms being arranged in the main scanning direction is being generally used under the present circumstances. Nevertheless, in the sub scanning direction, a V-shaped prism is characterized in reflecting, without deflecting, the angle of the light beam that entered the V-shaped prism. Accordingly, the direct light DL and the indirect light IL will have a different output optical intensity distribution in the sub scanning direction.

Figure 5:
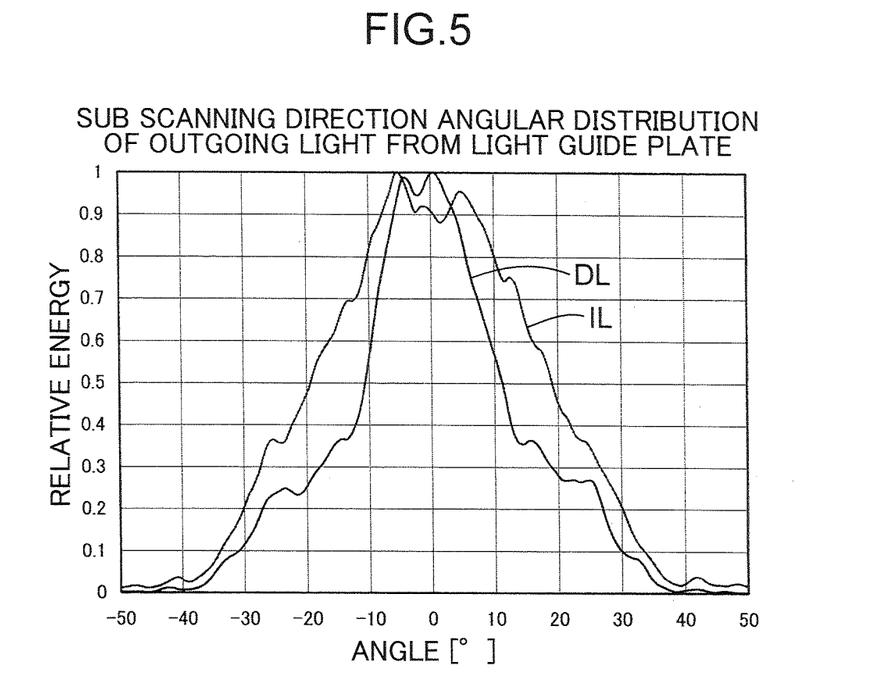
FIG. 5 is a graph showing the angular distribution of the optical intensity, in the sub scanning direction, of the direct light and the indirect light output from the light guide member.
Figure 6:
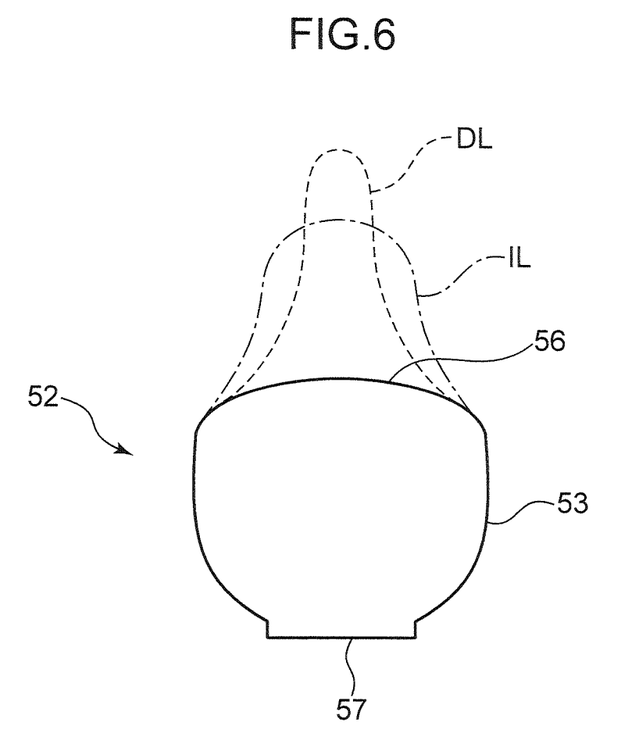
FIG. 6 is a diagram schematically showing the output condition of the direct light and the indirect light from the light guide member.

FIG. 5 is a graph showing the angular distribution of the optical intensity, in the sub scanning direction, of the direct light DL and the indirect light IL output from the light guide member 52 including the reflection pattern surface of the foregoing V-shaped prism. As evident from FIG. 5, the direct light DL has sharp characteristics comparison to the indirect light IL. FIG. 6 is a diagram schematically showing the intensity distribution of the direct light DL and the indirect light IL shown in the graph of FIG. 5 by causing the intensity scale to coincide.

When viewed from the sub scanning direction, the direct light DL will hardly diffuse since the illumination light L1, which directly heads to the reflecting surface 57 (V-shaped prism) from the light source 51 at a predetermined limited incidence angle, is reflected by the V-shaped prism at the same angle. This is the reason why the intensity distribution of the direct light DL is sharp. Meanwhile, the indirect light IL is the light that is created by the illumination light L2, which has every incidence angle as a result of being totally reflected by the peripheral surface of the main body part 53, being reflected off the V-shaped prism. Accordingly, the intensity distribution of the indirect light IL becomes relatively broad.

This kind of difference in the intensity distribution of the direct light DL and the indirect light IL induces a problem in that the uniformity of the illumination light cannot be obtained in the longitudinal direction of the light guide member 52. This is due to the direct light DL mainly being output from the portion near the entrance surface 54 as described above. If the intensity distribution of the illumination light differs in the main scanning direction, the variation of the amount of reflected light from the document sheet will differ when a position gap occurs in the reading position of the document sheet or when the document sheet floats from the contact glass. This will generate unevenness in the reading concentration in the main scanning direction.

In light of the foregoing problem, the present disclosure has devised the shape of the reflection pattern formed on the reflecting surface 57. This reflection pattern is formed from minute reflective concave parts formed on the flat reflecting surface 57 as recesses. The reflective concave parts each include a deflection surface which deflects the illumination light in a direction in which the reflection angle widens in the cross sectional view in the sub scanning direction (second direction), and then reflects the illumination light. The reflection pattern surface is formed on the reflecting surface 57 by a plurality of such reflective concave parts.

As a result of including this kind of reflection pattern surface, the illumination light that enters the reflective concave part is deflected in a direction in which the reflection angle widens on the deflection surface, then reflected. Thus, the reflection angle of the direct light DL in a cross sectional view of the sub scanning direction can be widened. Consequently, the characteristics of the direct light DL can be appropriated to the characteristics of the indirect light IL, and the uniformity of the illumination light output from the exit surface 56 in the main scanning direction can be secured. Moreover, the light guide member 52 can be configured in a minimal length.

Figure 8:
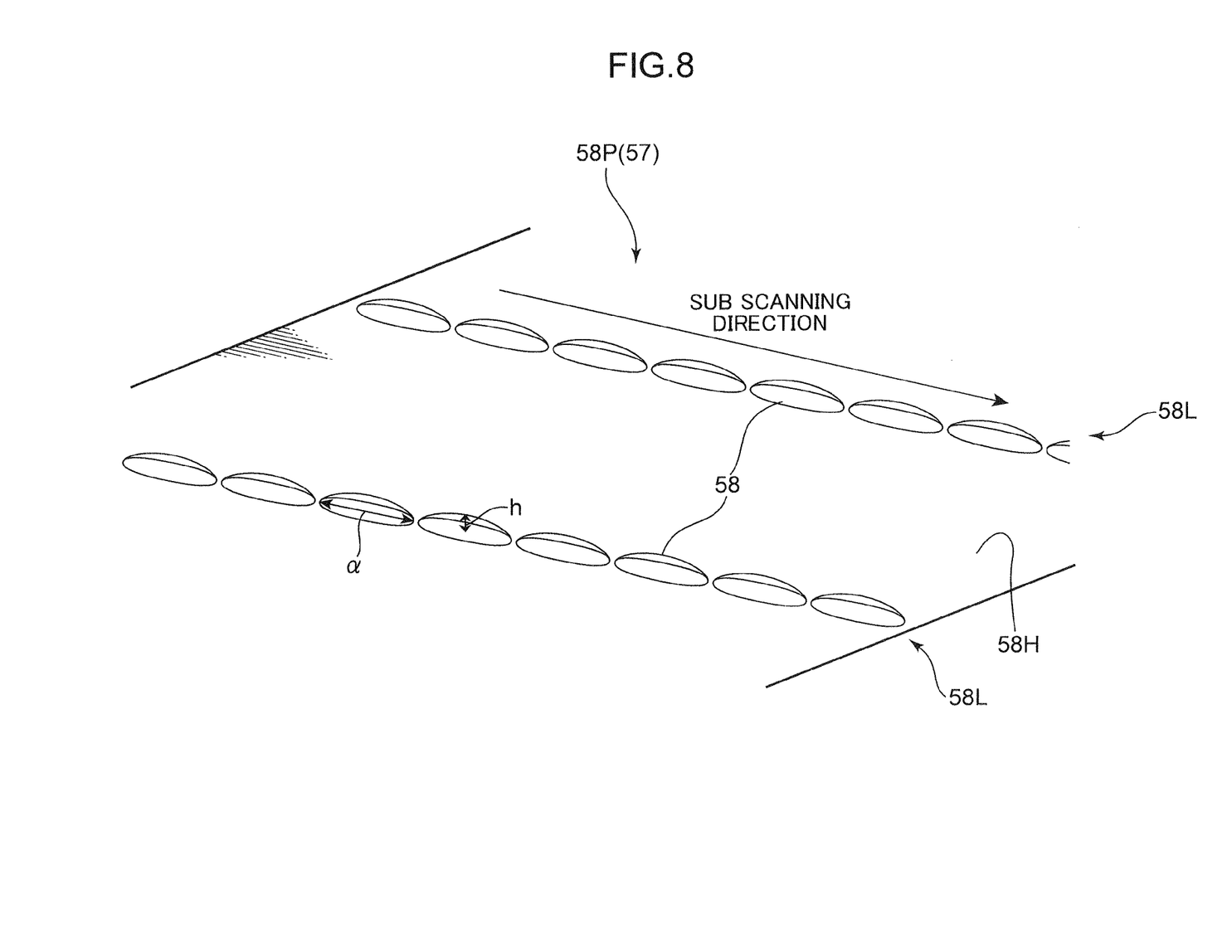
FIG. 8 is an expanded perspective view of the reflection pattern surface of the light guide member.
Figure 9:
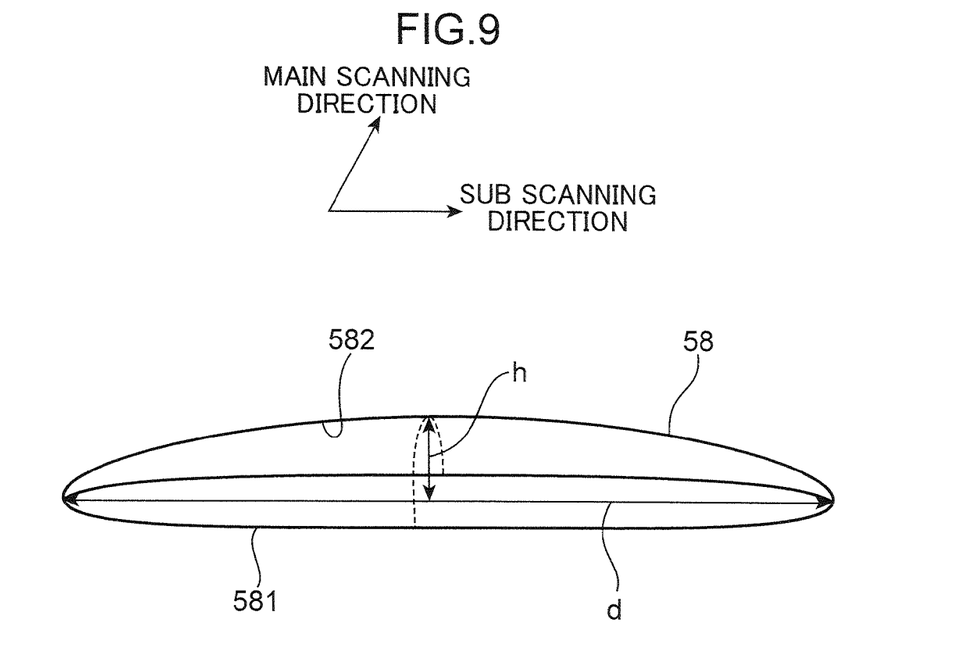
FIG. 9 is a diagram showing one reflective concave part.

A specific example of the reflecting surface 57 including the reflective concave part having the deflection surface is now explained. FIG. 7 is a perspective view showing the vicinity of the entrance surface 54 of the light guide member according to this embodiment, and FIG. 8 is an expanded perspective view of the reflection pattern surface 58P provided to the light guide member 52. Here, as an example of the reflective concave part having the foregoing deflection surface, an oval concave part 58 having a shape of a semi-oval body is illustrated. FIG. 9 is an enlarged diagram showing one oval concave part 58.

As explained previously with reference to FIG. 2, the illuminating device 50 includes a light source 51 and a light guide member 52. The light-emitting surface of the light source 51 faces and comes into contact with the entrance surface 54 of the light guide member 52. In FIG. 7, a light source 51 in which six white LEDs 51L are arranged in a 2×3 matrix is illustrated. The rod-shaped main body part 53 of the light guide member 52 includes an exit surface 56 which emits a linear illumination light toward the document sheet, and a reflecting surface 57 which faces the exit surface 56. The reflecting surface 57 is a flat face, and includes a reflection pattern surface 58P provided with a plurality of oval concave parts 58 having the function of reflecting, toward the exit surface 56, the illumination light that entered the light guide member 52 from the light source 51.

The oval concave part 58 is recessed from the reflecting surface 57 toward the inside of the main body part 53 so that the long diameter direction thereof extends in the sub scanning direction (second direction). As a result of a plurality of such oval concave parts 58 being arranged in series in a predetermined pitch in the sub scanning direction, one concave part array 58L (FIG. 8; unit reflective concave part array) is formed. The reflection pattern surface 58P is formed by a plurality of the concave part arrays 58L being juxtaposed in a predetermined pitch in the main scanning direction.

At the portion of the concave part array 58L, the illumination light is reflected toward the exit surface 56. The illumination light at such time is deflected in a direction in which the reflection angle widens in a cross sectional view in the sub scanning direction. Meanwhile, a flat part 58H exists between the concave part arrays 58L. The flat part 58H is a part that functions to totally reflect the illumination light so as to propagate the illumination light toward the far end face 55 (FIG. 2). Thus, the short diameter direction of the oval concave part is disposed in the main scanning direction. The reflection pattern surface 58P includes a starting end positioned toward the far end face 55 at a predetermined length from the entrance surface 54 on the reflecting surface 57. The position of this staring end is decided in consideration of the divergence angle of the illumination light emitted by the light source 51.

The light guide member 52 may be obtained by using a translucent resin material, and performing injection molding of melting the resin material and injecting it into a mold. In the foregoing case, the foregoing oval concave parts 58 (reflection pattern surface 58P) can be easily formed by providing a convex part of the semi-oval body at the portion corresponding to the reflecting surface 57 of the mold. In other words, the reflective concave part having a deflection function can be formed with a simple shape of a semi-oval body.

Referring to FIG. 9, the oval concave part 58 includes an oval opening 581 having a long diameter d of a predetermined length. In addition, the oval concave part 58 includes a semi-oval body concave curve 582 (deflection surface) in which the depth h (½ length of the short diameter of the oval body) from the opening 581 (flat face of the reflecting surface 57) is the deepest part. The depth h is set to a suitable size that is preferably 100 μm or less. For example, the depth h is desirably selected from a range of 15 μm to 90 μm.

Figure 10A:
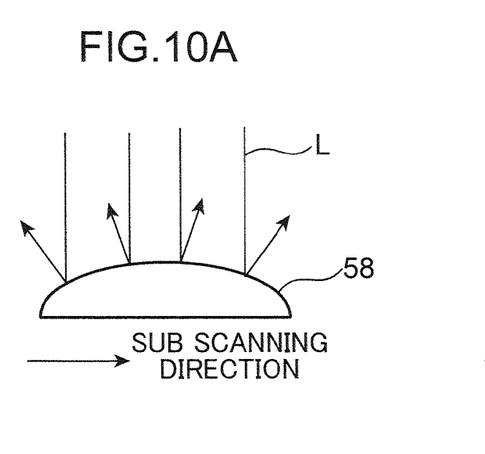
FIGS. 10A and 10B are diagrams explaining the reflection state of the illumination light based on the reflective concave part.
Figure 10B:
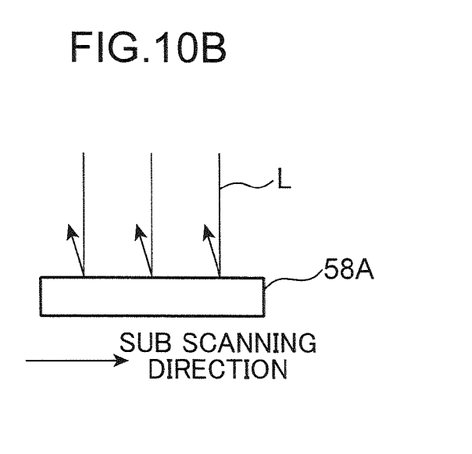

FIG. 10A and FIG. 10B are diagrams explaining the reflection state of the illumination light based on the reflective concave part. FIG. 10B shows the reflection state of the illumination light L based on the reflective concave part 58A such as the foregoing V-shaped prism which does not have a deflecting component in the sub scanning direction. As described above, with this kind of reflective concave part 58A, since the illumination light L is reflected without being deflected, the illumination light L will not diffuse in the sub scanning direction. Meanwhile, as shown in FIG. 10A, with a reflective concave part such as the oval concave part 58, the illumination light L is deflected as a result of being reflected by the concave curve 582, and the illumination light L will diffuse in the sub scanning direction. Thus, even in cases where the illumination light directly enters the oval concave part 58 from the light source 51, the characteristics of the reflected light; that is, the characteristics of the direct light DL (FIG. 4) output from the exit surface 56 can be caused to approach the characteristics of the indirect light IL.

Here, d:h as the ratio of the long diameter d and the depth h of the oval concave part 58 is desirably within the range of 3:1 to 15:1. As a result of the d:h ratio being within the foregoing range, the deflection characteristics of the direct light DL can be rationalized. In particular, d:h is desirably selected from the range of 5:1 to 8:1.

Figure 11:
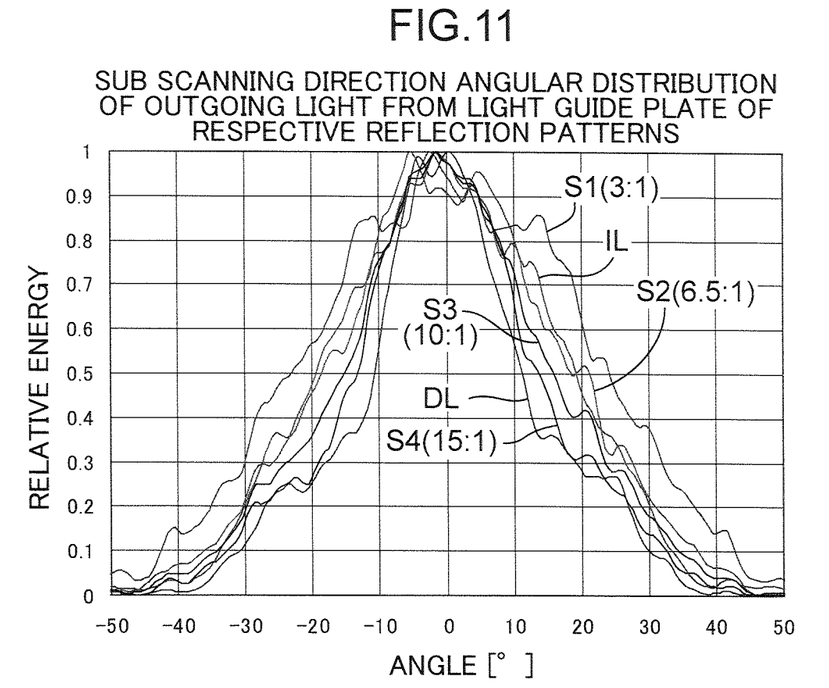
FIG. 11 is a graph showing the angular distribution of the optical intensity, in the sub scanning direction, when the shape of the reflective concave part is caused to be different.

FIG. 11 is a graph showing the measurement result of the angular distribution of the optical intensity, in the sub scanning direction, of the illumination light output from the exit surface 56 in a case where the shape (foregoing d:h) of the oval concave part 58 is caused to differ. In FIG. 11, curved lines DL and IL correspond to the direct light DL and the indirect light IL explained previously with reference to FIG. 5. Meanwhile, curved lines S1, S2, S3 and S4 form the reflection pattern surface 58P in which the oval concave parts 58 are provided to the reflecting surface 57, and show the optical intensity of the direct light DL when the foregoing d:h of the oval concave parts 58 is set respectively as follows.

S1 . . . d:h=3:1
S2 . . . d:h=6.5:1
S3 . . . d:h=10:1
S4 . . . d:h=15:1

As evident from FIG. 11, as a result of providing the reflection pattern surface 58P having the oval concave parts 58 to the light guide member 52, the sharpness of the curved lines S1, S2, S3 and S4 is alleviated in comparison to the conventional direct light DL, and it can be seen that the direct light DL has directional characteristics that approach the indirect light IL. In particular, the curved line S2 has characteristics which are approximate to the indirect light IL. When the long diameter d is made shorter than the curved line S1, the degree of deflection increases excessively, and the tendency of the illumination light being excessively diffused becomes prominent. Meanwhile, when the long diameter d is made longer than the curved line S4, the deflecting function will deteriorate and the characteristics of the oval concave part 58 also approach the characteristics of a V-shaped prism. Accordingly, d:h is desirably selected from the range of 3:1 to 15:1, and, from the perspective of causing the angular distribution of the direct light DL to further approach the indirect light IL, d:h is desirably selected from the range of 5:1 to 8:1.

According to the illuminating device 50 of this embodiment explained above, the characteristics of the direct light DL reflected off the reflecting surface 57 can be caused to approximate the characteristics of the indirect light IL. In other words, difference in the intensity distribution of the direct light DL and the indirect light IL as shown in the example of FIG. 6 will not arise, and the direct light DL and the indirect light IL will substantially have the same intensity distribution. Accordingly, a uniform linear illumination light can be output from the light guide member 52 in the main scanning direction. Moreover, even when the near end of the exit surface 56 is disposed near the entrance surface 54, the uniformity of the illumination light output from the exit surface 56 is maintained. Thus, the light guide member 52 can be configured in a minimal length. Moreover, even when the light guide member 52 is formed from a member obtained by metal-molding a translucent resin material, the mold shape will not be complex since it will suffice by providing protrusions of a semi-oval body to the mold. In addition, since the light guide member 52 can be formed in a minimal length, there is another advantage in that the light guide member will not warp easily.

The preferred embodiments of the present disclosure were explained above, the present disclosure is not limited thereto and, for example, may also adopt the following modified embodiments.

(1) In the foregoing embodiment, illustrated was the reflection pattern surface 58P configured by juxtaposing the plurality of concave part arrays 58L of the oval concave part 58 in a predetermined pitch in the main scanning direction. However, so as long as the oval concave part 58 has the foregoing ratio of long diameter d:depth h and the long diameter thereof is oriented in the sub scanning direction, there is no particular limitation in the way of arrangement of the number of oval concave parts 58 to be arranged. Note that the long diameter direction of the oval concave part 58 and the sub scanning direction do not need to be completely consistent, and there may be a slight offset between the two.

For example, the reflection pattern surface 58P may also be configured by arranging the oval concave part 58 in the sub scanning direction, not linearly but in a zigzag, and juxtaposing a plurality of such zigzag arrays in the main scanning direction. Moreover, each oval concave part 58 does not have to be completely independent and, for example, in a case where a plurality of oval concave parts 58 are arranged in the sub scanning direction, the adjacent oval concave parts 58 may be united near the edge in the long diameter direction. Moreover, all oval concave parts 58 do not need to be formed in the same size, and the reflection pattern surface 58P may be configured such that the oval concave parts 58 of different sizes coexist.

(2) In the foregoing embodiment, illustrated was an example of providing, on the reflecting surface 57 of the light guide member 52, only the reflection pattern surface 58P formed from the oval concave part 58. It will suffice if the reflection pattern surface 58P of the oval concave parts 58 is disposed at least in a region near the entrance surface 54 of the main body part 53 which mainly generates the direct light DL, and the other portions of the reflecting surface 57 may be another reflection pattern surface formed from a plurality of reflective concave parts that do not include a deflection surface.

Figure 12:
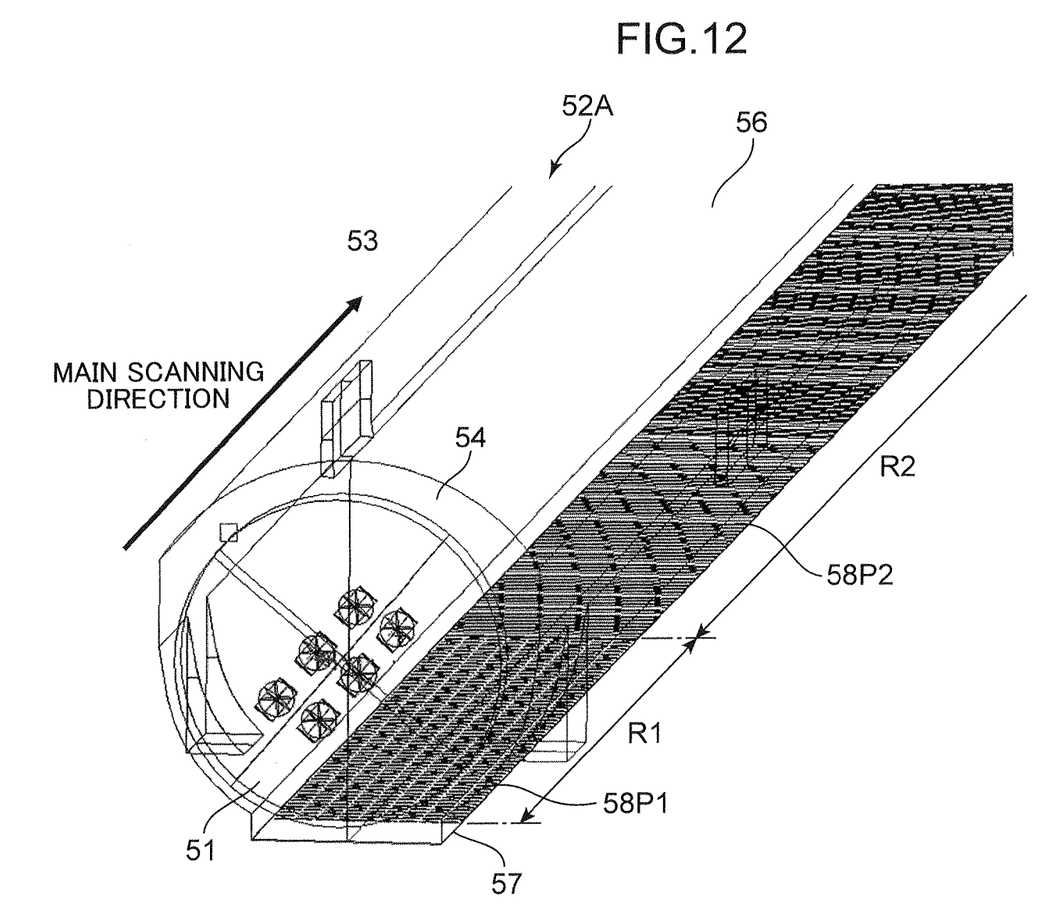
FIG. 12 is a perspective view showing the light guide member according to another embodiment.

FIG. 12 is a perspective view showing the light guide member 52A according to a modified embodiment. With the light guide member 52A, the reflection pattern surface formed on the reflecting surface 57 is formed from patterns which are different in a first region R1 near the entrance surface 54 of the main body part 53, and a second region R2 on a far end side that is farther than the first region R1. In the first region R1 is formed a first reflection pattern surface 58P1 including the foregoing oval concave parts 58. Meanwhile, in the second region R2 is formed a second reflection pattern surface 58P2 including a pattern formed from a plurality of arrays of a V-shaped prism configured from a V-shaped concave groove extending in the sub scanning direction and which does not possess the function of deflecting the illumination light.

As previous explained with reference to FIG. 4, the direct light DL is mainly generated in the first region R1 near the entrance surface 54. Meanwhile, since the indirect light IL will be dominant in the second region R2, the necessity to diffuse the illumination light is low. Accordingly, it is possible to substantially ensure the uniformity of the linear illumination light that is output from the light guide member 52 even with a way where the oval concave parts 58, which are reflective concave parts including a deflection surface, are arranged only in the first region R1.

(3) In the foregoing embodiment, illustrated was the oval concave part 58 configured from a semi-oval body as the reflective concave part including a deflection surface. It will suffice if the reflective concave part includes a deflection surface which deflects, in the sub scanning direction, the illumination light in a direction in which the reflection angle widens, and then reflects the illumination light, and is not limited to an oval curved surface. For example, the deflection surface may also be formed as an aspheric surface.

(4) In the foregoing embodiment, illustrated was an example of using a phosphor excitation-type white LED 51L as the light source 51. Alternatively, it is also possible to use a white LED which creates a white light by combining three LEDs that respectively emit the light's three primary colors. Moreover, a point light source other than an LED may also be used.

As described above, according to the present disclosure, it is possible to output a uniform illumination light using a light guide member of a minimal size. Accordingly, the light guide member can be miniaturized, and the illuminating device comprising this light guide member, and the image reading apparatus and the image forming apparatus using this illuminating device can also be miniaturized.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A light guide member which is used by being combined with a light source that emits an illumination light, comprising:
   a main body part which has a long rod shape in a first direction and guides the illumination light;
   an entrance surface which is one end face of the main body part and through which the illumination light enters;
   a strip-shaped exit surface which extends in the first direction on a surface of the main body part and from which the illumination light is output; and
   a strip-shaped reflecting surface which extends in the first direction on a face of the main body part, the face being placed opposite to the exit surface, and which reflects the illumination light; wherein
   the reflecting surface includes, on a flat face, a reflection pattern surface provided with a plurality of minute reflective concave parts having a function of reflecting the illumination light toward the exit surface, and
   the reflective concave parts each include a deflection surface which deflects the illumination light in a direction in which a reflection angle widens in a cross sectional view in a second direction that is orthogonal to the first direction in a horizontal direction, and reflects the illumination light, wherein
   the reflective concave parts each have a shape of a semi-oval body, and a long diameter direction thereof extends in the second direction, and
   when a long diameter of the semi-oval body is d and a depth of the semi-oval body from the flat face is h,
   d:h is within a range of 3:1 to 15:1.

2. The light guide member according to claim 1, wherein the reflection pattern surface is a reflection pattern surface in which a plurality of unit reflective concave part arrays, each formed by serially arranging a plurality of the reflective concave parts in the second direction, are juxtaposed in the first direction.

3. A light guide member which is used by being combined with a light source that emits an illumination light, comprising:
   a main body part which has a long rod shape in a first direction and guides the illumination light;
   an entrance surface which is one end face of the main body part and through which the illumination light enters;
   a strip-shaped exit surface which extends in the first direction on a surface of the main body part and from which the illumination light is output; and
   a strip-shaped reflecting surface which extends in the first direction on a face of the main body part, the face being placed opposite to the exit surface, and which reflects the illumination light; wherein
   the reflecting surface includes, on a flat face, a reflection pattern surface provided with a plurality of minute reflective concave parts having a function of reflecting the illumination light toward the exit surface, and
   the reflective concave parts each include a deflection surface which deflects the illumination light in a direction in which a reflection angle widens in a cross sectional view in a second direction that is orthogonal to the first direction in a horizontal direction, and reflects the illumination light, wherein the reflection pattern surface is formed in a first region near the entrance surface of the main body part, and another reflection pattern surface formed from a plurality of reflective concave parts, each of which is not provided with the deflection surface, is formed in a second region of the main body part other than the first region.

4. The light guide member according to claim 1, wherein the light guide member is configured from a member obtained by molding a translucent resin material.

5. An illuminating device, comprising:

a light source which emits an illumination light; and a light guide member which is used by being combined with the light source; wherein the light guide member includes:
- a main body part which has a long rod shape in a first direction and guides the illumination light;
- an entrance surface which is one end face of the main body part and through which the illumination light enters;
- a strip-shaped exit surface which extends in the first direction on a surface of the main body part and from which the illumination light is output; and
- a strip-shaped reflecting surface which extends in the first direction on a face of the main body part, the face being placed opposite to the exit surface, and which reflects the illumination light; wherein the reflecting surface includes, on a flat face, a reflection pattern surface provided with a plurality of minute reflective concave parts having a function of reflecting the illumination light toward the exit surface, and the reflective concave parts each include a deflection surface which deflects the illumination light in a direction in which a reflection angle widens in a cross sectional view in a second direction that is orthogonal to the first direction in a horizontal direction, and reflects the illumination light, wherein the reflection pattern surface is formed in a first region near the entrance surface of the main body part, and another reflection pattern surface formed from a plurality of reflective concave parts, each of which is not provided with the deflection surface, is formed in a second region of the main body part other than the first region.

6. The illuminating device according to claim 5, wherein the reflective concave parts each have a shape of a semi-oval body, and a long diameter direction thereof extends in the second direction.

7. The illuminating device according to claim 6, wherein when a long diameter of the semi-oval body is d and a depth of the semi-oval body from the flat face is h, d:h is within a range of 3:1 to 15:1.

8. The illuminating device according to claim 5, wherein the reflection pattern surface is a reflection pattern surface in which a plurality of unit reflective concave part arrays, each formed by serially arranging a plurality of the reflective concave parts in the second direction, are juxtaposed in the first direction.

9. The illuminating device according to claim 5, wherein the light guide member is configured from a member obtained by molding a translucent resin material.

10. An image reading apparatus, comprising:

the illuminating device according to claim 5 which irradiates an illumination light on a document sheet; and a light-receiving device which receives a reflected light from the document sheet and converts the reflected light into an electrical signal; wherein the first direction is a main scanning direction, and the second direction is a sub scanning direction.

11. An image forming apparatus, comprising:

the image reading apparatus according to claim 10; and an image carrier in which an electrostatic latent image is formed on a peripheral surface thereof based on image data output from the image reading apparatus.

* * * * *